United States Patent [19]

Desai

[11] Patent Number: 4,847,459
[45] Date of Patent: Jul. 11, 1989

[54] BOWL-SHAPED PLASTIC MICROWAVE DISH

[75] Inventor: Manohar P. Desai, Minden, Fed. Rep. of Germany

[73] Assignee: Melitta-Werke Bentz & Sohn, Minden, Fed. Rep. of Germany

[21] Appl. No.: 39,897

[22] Filed: Apr. 20, 1987

[30] Foreign Application Priority Data

Apr. 19, 1986 [DE] Fed. Rep. of Germany ....... 3613298

[51] Int. Cl.$^4$ .............................................. H05B 6/64
[52] U.S. Cl. ...................... 219/10.55 E; 99/DIG. 14; 126/390; 220/421; 220/366
[58] Field of Search ............... 219/10.55 E, 10.55 F, 219/10.55 R; 220/420, 421, 440, 426, 410, 427, 428, 469, 366; 126/390, 389; 99/DIG. 14, 451

[56] References Cited

U.S. PATENT DOCUMENTS

| | | | |
|---|---|---|---|
| 1,927,255 | 9/1933 | Brown | 220/420 |
| 3,745,290 | 7/1973 | Harnden, Jr. et al. | 29/10.49 R |
| 3,979,572 | 9/1976 | Ito et al. | 219/10.49 R |
| 4,314,638 | 2/1982 | Gordon et al. | 220/440 |
| 4,413,167 | 11/1983 | Martel et al. | 219/10.55 E |
| 4,478,349 | 10/1984 | Haverland, Jr. et al. | 219/10.55 E X |
| 4,486,640 | 12/1984 | Bowen et al. | 219/10.55 E |
| 4,663,506 | 5/1987 | Bowen et al. | 219/10.55 E |

Primary Examiner—Philip H. Leung
Attorney, Agent, or Firm—Spencer & Frank

[57] ABSTRACT

Bowl-shaped plastic dish for use in microwave ovens, the dish having a two-part structure composed of an inner shell and an outer shell, each shell having a circumferential, laterally projecting edge web, the inner and outer shells being spaced from one another to define a space containing air, and the shells being welded or glued to one another in the region of the webs to seal the air space.

22 Claims, 5 Drawing Sheets

FIG. 8
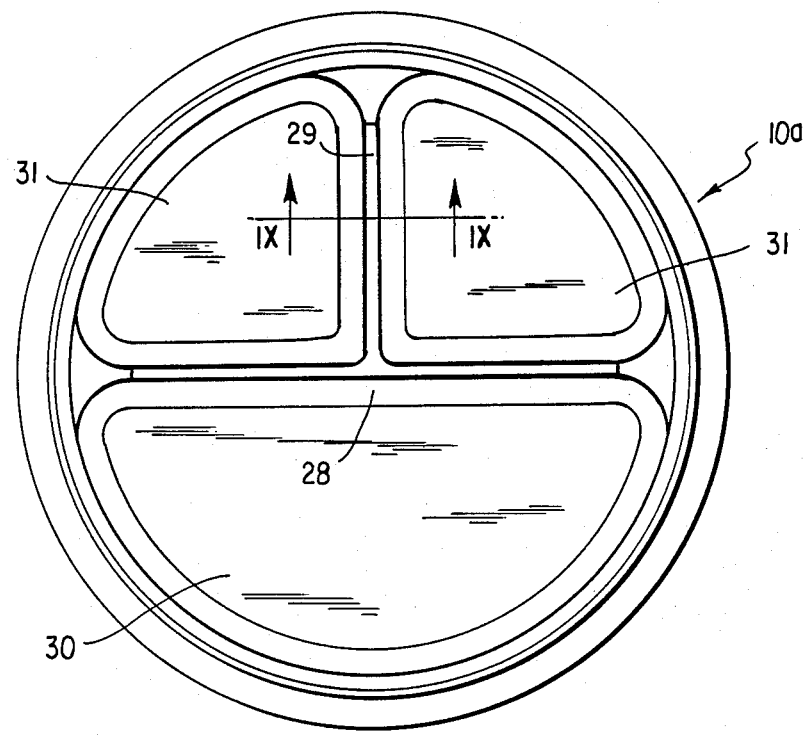
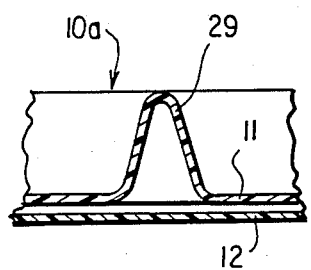
FIG. 9
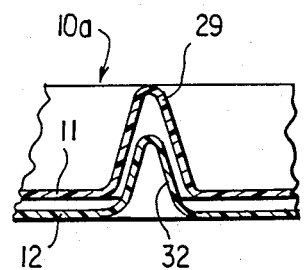
FIG. 10

BOWL-SHAPED PLASTIC MICROWAVE DISH

BACKGROUND OF THE INVENTION

The present invention relates to a bowl-shaped plastic microwave dish, for example in the form of a serving bowl, a partitioned dinner plate or the like.

Microwave ovens are becoming increasingly more popular, particularly for home use, because, in a microwave oven, food can be cooked or thawed in the shortest possible time and can be reheated if desired. Correspondingly, the demand for dishes suitable for use in microwave ovens is increasing.

In principle two types of microwave dishes are known.

A first type includes simple plastic dishes having extremely thin walls which are used as throw-away packages. Such dishes are usually used for the sale of completely prepared and precooked foods which the end user merely heats in the microwave oven in the dish in question. After consumption of the food, this dish is discarded.

Plastic dishes for repeated use in microwave ovens are known to be relatively solid and therefore also correspondingly stable. Such dishes are usually manufactured in an injection molding process or are pressed of a correspondingly high-grade plastic material.

The latter category of dishes is comparatively expensive because, on the one hand, the plastic employed is of a relatively high quality and therefore very expensive and, on the other hand, the manufacture of such dishes in their respective molds is very time consuming and thus cost intensive.

SUMMARY OF THE INVENTION

It is an object of the present invention to provide a dish of this type which, with the smallest amount of material employed and low total manufacturing costs, has a stiffness and stability that permit repeated use without difficulty.

The above and other objects are accomplished, according to the present invention, by a bowl-shaped plastic dish having a double shell structure composed of an inner shell and an outer shell, with the inner and outer shells being spaced from one another to delimit an enclosed air space, the dish having circumferentially and laterally projecting edge webs where the shells are welded or glued together.

Due to the double shell structure of the dish and the firm connection of the two shells in the region of the edge webs which are stabilizing in any case, the smallest amount of material produces the highest degree of stiffness and strength so that such a dish is certainly able to withstand repeated home use. Due to the small amount of material employed, the dish itself is comparatively inexpensive and additionally offers a number of advantages which are realized because of its dual shell structure.

For example, one of these advantages is that less energy is required than before to heat food in such a dish since the air enclosed between the inner and outer shell serves as an insulating layer. The same insulating effect brings about the further advantage that heated foods will remain hot for a longer period of time after removal from the oven.

Due to the double shell structure, the shape of the dish offers considerably more possibilities than was the case in the past since inner and outer shell can be designed substantially independently of one another. Care must merely be taken that the inner and outer shells have practically the same shape in the region of their edge webs so that here a tight and firm bond can be produced.

The inner and outer shells may also easily be given different colors.

Due to the above-mentioned stiffness and strength, such a dish is also dishwasher proof and thus meets all requirements for dishes in modern household use.

BRIEF DESCRIPTION OF THE DRAWING

Embodiments of the invention are illustrated in the attached drawing figures and will be described in greater detail below.

FIG. 8 is a top plan view of a dish according to a further embodiment of the invention.

FIG. 9 is a cross-sectional detail view along line IX—IX of FIG. 8.

FIG. 10 is a cross-sectional detail view corresponding to FIG. 9 of a dish according to a further embodiment of the invention.

DESCRIPTION OF THE PREFERRED EMBODIMENTS

Figure 1:
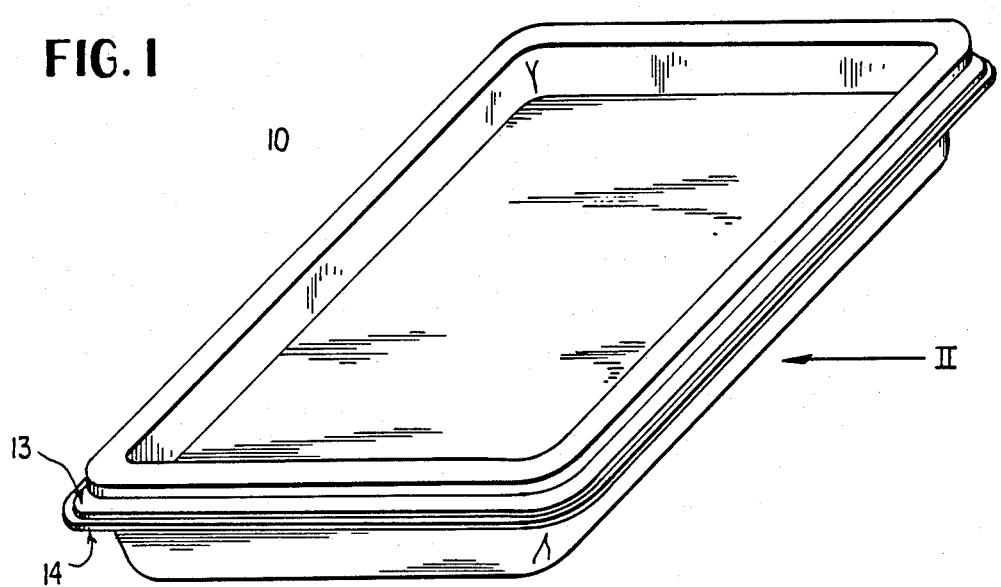
FIG. 1 is a perspective view of a dish for microwave ovens in the form of a serving dish.
Figure 2:
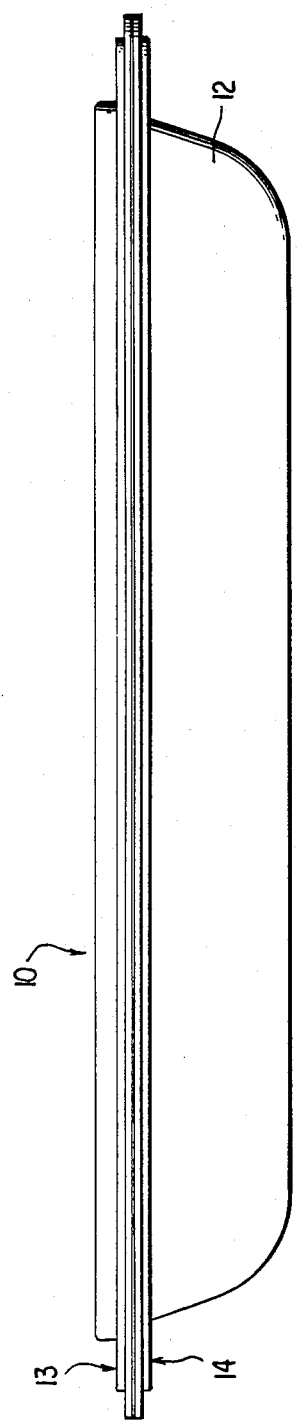
FIG. 2 is a side elevational view of the dish seen in the direction of arrow II of FIG. 1.

The embodiment of the invention shown in FIGS. 1 to 4 is a plastic bowl-shaped dish 10 for microwave ovens which, as shown clearly in FIGS. 1 and 2, is a serving dish.

However, it must be pointed out here that the idea of the invention is not limited to any particular dish shape. This will be discussed in greater detail below with reference to the embodiment according to FIG. 8.

Figure 3:
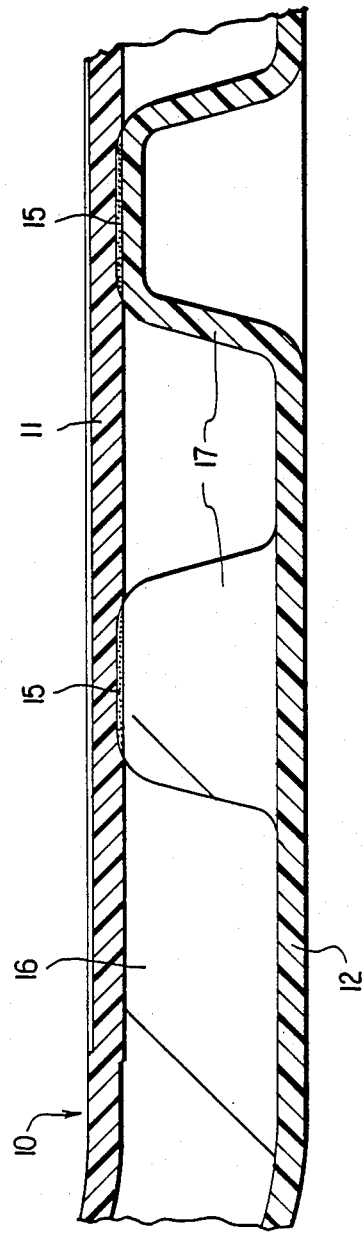
FIG. 3 is a greatly enlarged cross-sectional detail view of the dish according to FIGS. 1 and 2 showing the bottom section thereof.
Figure 4:
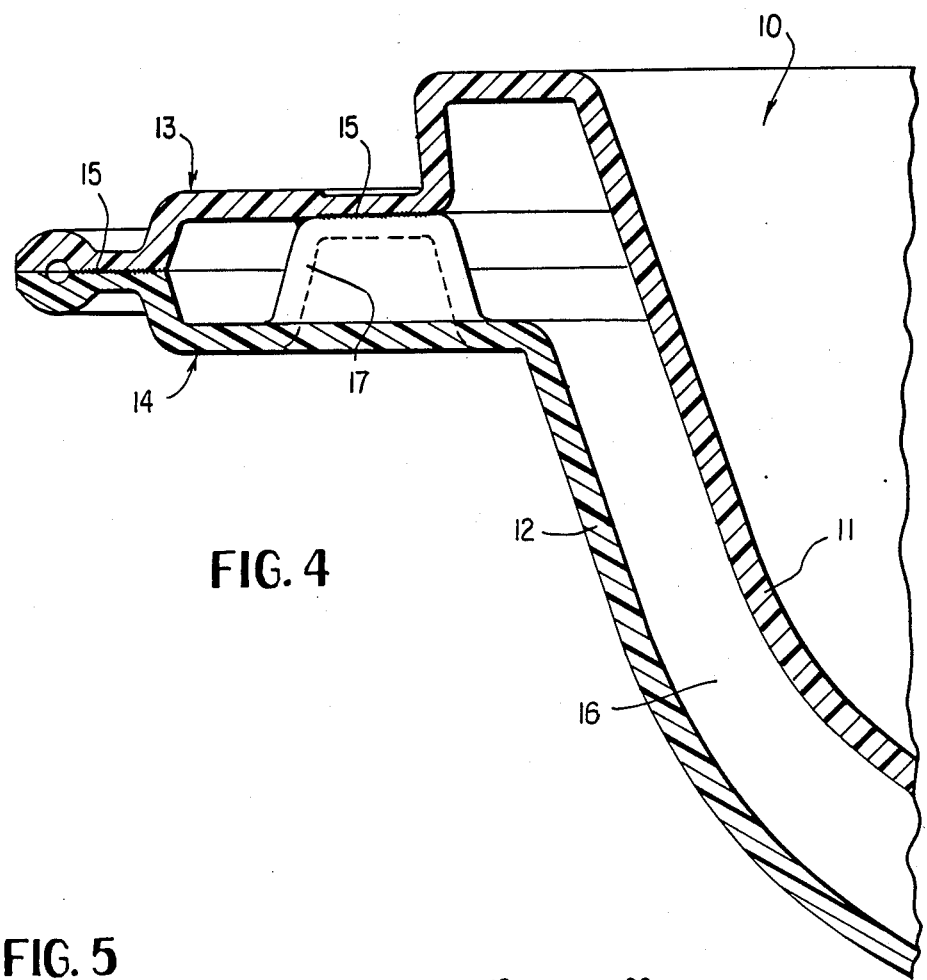
FIG. 4 is a cross-sectional detail view of the edge region of the dish of FIGS. 1 and 2.

As is particularly clear in FIGS. 3 and 4, dish 10 is composed of an inner shell 11 and an outer shell 12. As can be clearly seen each of shells 11 and 12 is provided with a circumferential edge web, 13 and 14, respectively, in the upper region of dish 10. These webs also project laterally with respect to the dish and form a rim. In the region of these circumferential edge webs 13 and 14, inner shell 11 and outer shell 12 are firmly connected to one another, preferably by means of welding as indicated at 15 at the left-hand side of FIG. 4. As an alternative, inner shell 11 and outer shell 12 may, however, also be glued together by means of a suitable adhesive.

Otherwise, inner shell 11 and outer shell 12 are spaced from one another so that an enclosed space 16 is formed between the two shells 11 and 12 and this space is filled with air.

Inner shell 11 and outer shell 12 are each a one-piece, deep-drawn plastic part.

Depending on the size of the total basic area of dish 10, its overall stiffness and stability can be increased by providing supporting bosses 17, which are preferably drawn into outer shell 12 and extend to inner shell 11. They are fixed by welding to inner shell 11, as shown at 15, where bosses 17 contact shell 11. With these supporting bosses 17, the overall strength of dish 10 can be increased considerably in spite of the small amount of material employed and the consequently thin walls of inner shell 11 and outer shell 12.

Such bosses 17 can be provided along the interior portion of dish 10, as shown in FIG. 3, and/or at edge webs 13 and 14, as shown in FIG. 4.

The space 16 existing between inner shell 11 and outer shell 12, which is filled with air, serves as an insulating layer with the result that, on the one hand, food disposed in such a dish 10 can be heated comparatively quickly in a microwave oven since the heat losses through the walls of dish 10 are relatively low and, on the other hand, due to the insulating effect of the trapped air, there is the positive effect that the heated food is kept hot for a relatively long period of time.

Figure 5:
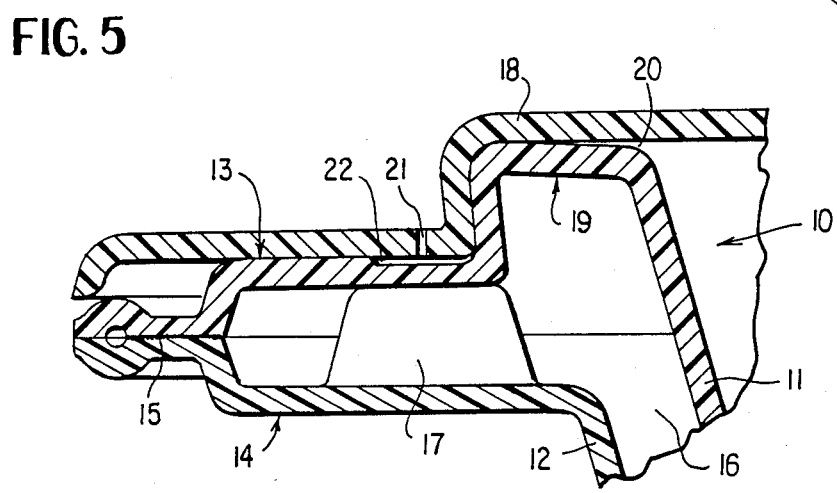
FIG. 5 is a cross-sectional detail view, corresponding to that of FIG. 4, of a dish having a removable lid according to a further embodiment of the invention.

FIG. 5 shows an embodiment of the invention in which dish 10 again has the shape of a serving bowl. Here again, the inner shell 11 is provided with a circumferential, projecting edge web 13 and the outer shell with a corresponding edge web 14. Both edge webs 13 and 14 are again welded together at 15. Here again, supporting bosses 17 can be provided, and welded to inner shell 11 and web 13, to increase overall stability.

In the illustrated embodiment, dish 10 may be provided with a covering lid 18 likewise made of plastic. The upper supporting edge 19 of dish 10 is conically tapered on the outside so that it slopes downwardly in the direction toward the center of dish 10, with the shape of lid 18 being selected to correspond to web 13 and edge 19. This design provides a desirable, airtight seal for the contents of dish 10 by means of lid 18.

If food disposed in closed dish 10 is to be heated in a microwave oven, it is necessary to permit air to escape from dish 10.

This is accomplished in the embodiment according to FIG. 5 in that a type of "pressure relief" valve is integrated, on the one hand, in supporting edge 19 of dish 10 and, on the other hand, in lid 18. As can be clearly seen in FIG. 5, part of dish 10, in the region of its supporting edge 19, is provided with a groove 20 which widens toward the interior of dish 10 and lid 18 is provided with a ventilation bore 21. When lid 18 is in place, ventilation bore 21 opens into a recess 22 in the upper surface of edge web 13 of inner shell 11.

If, now, during heating of food a certain excess pressure develops in the interior of dish 10, which is closed by lid 18, this excess pressure is able to escape through groove 20, recess 22 and ventilation bore 21 as a result of the elasticity of supporting edge 19 and/or lid 18.

Figure 6:
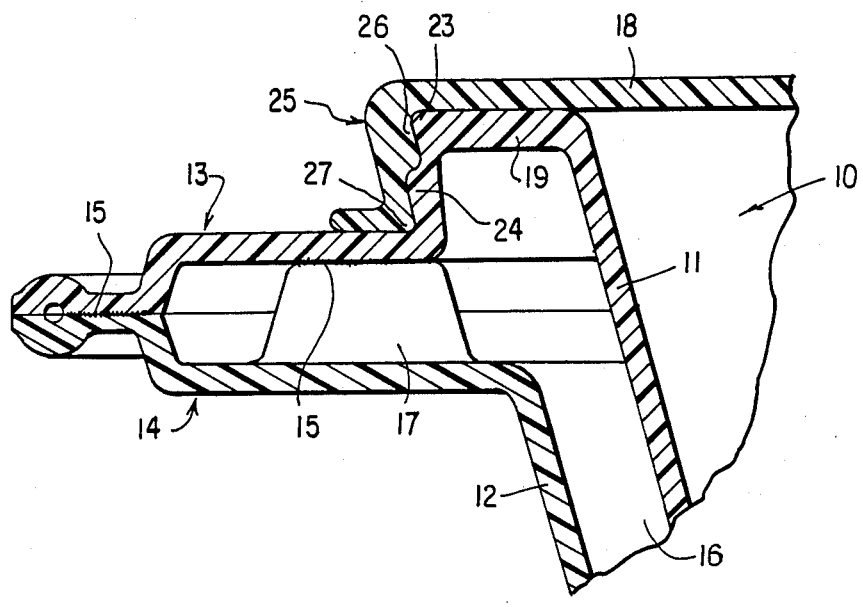
FIGS. 6 and 7 are cross-sectional detail views corresponding to FIG. 5 of a further embodiment of a dish having a lid.
Figure 7:
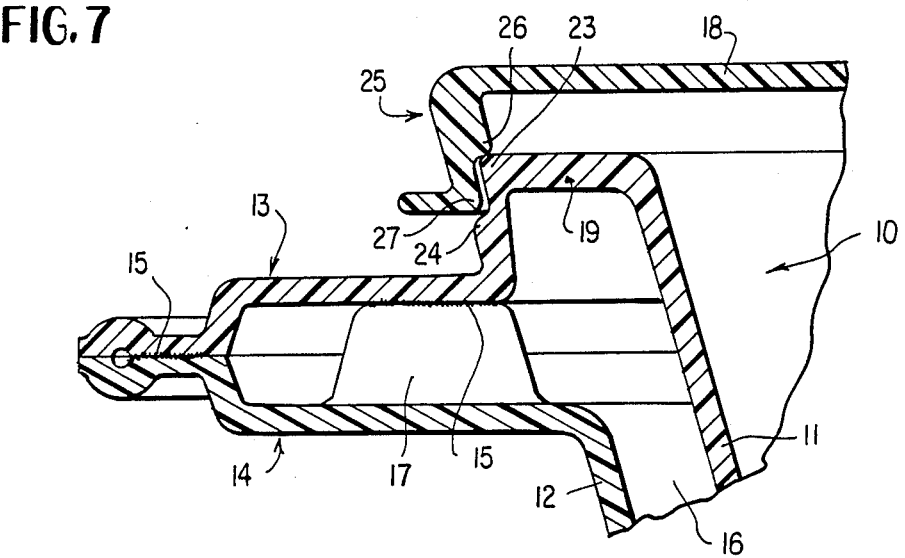

In the embodiment of the invention shown in FIGS. 6 and 7, the upper supporting edge 19 of dish 10 is provided on the circumference of dish 10 with two mutually vertically offset steps 23 and 24. Lid 18 is equipped on its interior, in the region of its closing edge 25, with correspondingly offset projections 26 and 27.

If, as shown in FIG. 6, lid 18 is pressed completely onto supporting edge 19 of dish 10, the interior of the dish is airtightly sealed. If, however, lid 18 is placed partially onto supporting edge 19 of dish 10 so that lower projection 27 is above lower step 24, the dish is still essentially closed while permitting air under pressure to pass. This means that in this closed position, in which only one step is engaged, food in dish 10 can be heated in the microwave oven without developing an undesired excess pressure in the interior of dish 10.

The airtight closed position for dish 10 shown in FIG. 6 is desirable for freezing food.

FIG. 8 shows a microwave oven dish 10a which, in contrast to the above described configurations, is designed as a partitioned dinner plate. This dish 10a has basically a circular shape and is provided in its bowl-shaped interior with partition bars 28 and 29. These partition bars 28 and 29 create various compartments 30 and 31 within the dinner plate. Plate 10a can additionally have edge webs as in the embodiments of FIGS. 1–7.

As is clearly shown in FIG. 9, partition bars 28 and 29 may be provided exclusively in inner shell 11, but there also exists the possibility of equipping the respective outer shell 12 of dish 10a with corresponding protrusions 32 in the region of partition bars 28 or 29, as shown in FIG. 10. In addition, it is possible to provide supporting bosses, like 17 in FIGS. 2–7, in the region between partition bars 28 or 29 and corresponding protrusions 32 in outer shell 12 and to connect these bosses with inner shell 11 by welding. Such bosses can also be provided in the flat regions and at the edge webs of dish 10a.

The above statements show that the double shell structure according to the invention of a dish 10 or 10a according to the invention allows for manifold design possibilities which, on the one hand, serve to increase the inherent stiffness, stability and strength of the dish 10 or 10a itself and, on the other hand, also make it possible to influence in an extremely versatile way the exterior shape of such a dish 10 or 10a.

For example, inner shell 11 may certainly have a different outline than outer shell 12; only in the region of the two edge webs 13 and 14 which are to be connected together, must inner shell 11 and outer shell 12 be congruent. There also exists the possibility of giving the inner shell 11 a different color from outer shell 12.

With all the stability of the entire dish 10 or 10a, inner shell 11 as well as outer shell 12 in themselves retain a certain elasticity so that it is easily possible to clamp a metal plate or the like into such a dish 10 or 10a which, when used in a microwave oven, serves to produce a browning effect for meats or the like.

Within the scope of the present invention, inner shell 11 and outer shell 12 may also each be made of one piece as ejection molded items in which case, in order to retain the advantages mentioned repeatedly above, care must be taken that these injection molded pieces have relatively thin walls.

Figure 11:
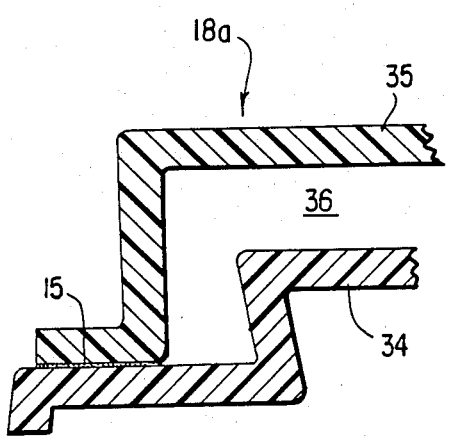
FIG. 11 is a cross-sectional detail view of part of one embodiment of a lid for a microwave dish according to the invention.

The lids 18 shown in FIGS. 5 to 7 may of course have a double shell structure as well, similar to dish 10 so that the stated insulating effect also applies to the respective lid 18. A portion of such a lid, 18a, is shown in FIG. 11. This includes an inner lid shell 34 and an outer lid shell 35, the two lid shells having respective circumferential, laterally projecting edge webs via which lid shells 34 and 35 are welded or glued to one another at 15 to form a sealed air space 36.

Recess 22 in wedge web 13 shown in FIG. 5 extends preferably around the entire periphery of edge web 13. This has the advantage that, independently of the position in which lid 18 is placed, ventilation bore 21 always opens into circumferential recess 22. This means that it is not necessary to note at which point recess 22 is disposed when lid 18 is placed onto the dish.

Each shell of a dish according to the invention, as well as the, or each part of the, lid, can be made of any known type of plastic suitable for use in a microwave oven. The plastic can be one of the high quality types mentioned at the outset since considerably less material is needed for the two shells than for the solid dishes known in the art.

The invention now being fully described, it will be apparent to one of ordinary skill in the art that many changes and modifications can be made thereto without departing from the spirit or scope of the invention as set forth herein.

The present disclosure relates to the subject matter disclosed in German Application No. P 36 13 298.5 of Apr. 19th, 1986, the entire specification of which is incorporated herein by reference.

I claim:

1. A container for use in microwave ovens, comprising:
    a dish having an upper supporting edge and a two-part structure which includes a plastic, microwave-transparent inner shell and a plastic, microwave-transparent outer shell, each said shell having a peripheral, laterally projecting edge web, said inner and outer shells being spaced from one another to define a space containing air, and said shells being welded or glued to one another in the region of said webs to seal the air space; and
    a lid made of one piece of plastic and constructed to be placed in an airtight manner onto said upper supporting edge of said dish,
    wherein said upper supporting edge is provided with a groove which deepens toward the interior of said dish, said lid is provided with a ventilation bore which is located to be outside of said upper supporting edge when said lid is placed on said dish, and said edge web of said inner shell has an upper surface provided with a recess which communicates with said bore when said lid is placed on said dish.

2. A container as defined in claim 1 wherein, in the region of said edge webs, one of said shells is provided with at least one supporting boss which lies against, and is welded or glued to, the other said shell.

3. A container as defined in claim 1 wherein each said shell is constituted by a one-piece, deep-drawn member.

4. A container as defined in claim 1 wherein said inner shell is provided with at least one partitioning bar which subdivides the interior of said dish into separate compartments.

5. A container as defined in claim 4 wherein, in the region of said partitioning bar, said outer shell is provided with a protrusion corresponding in shape to said bar.

6. A container as defined in claim 1 wherein said recess extends around the entire circumference of said edge web of said inner shell.

7. A container as defined in claim 1 wherein said inner shell and said outer shell are each made of a one-piece, thin-walled, injection molded member.

8. A container for use in microwave ovens, comprising:
    a dish having an upper supporting edge and a two-part structure which includes a plastic, microwave-transparent inner shell and a plastic, microwave-transparent outer shell, each said shell having a peripheral, laterally projecting edge web, said inner and outer shells being spaced from one another to define a space containing air, and said shells being welded or glued to one another in the region of said webs to seal the air space; and
    a lid made of one piece of plastic and constructed to be placed in an airtight manner onto said upper supporting edge of said dish,
    wherein said supporting edge has a radially exterior surface provided with two mutually offset steps, said lid has a closing edge provided with corresponding projections, with the engagement of both projections with said steps producing an airtight seal for said dish, while engagement of only one projection in one step produces a closure of the dish which permits air to escape from the region between said dish and said lid.

9. A container for use in microwave ovens, comprising:
    a dish having an upper supporting edge and a two-part structure which includes a platic, microwave-transparent inner shell and a plastic, microwave-transparent outer shell, each said shell having a peripheral, laterally projecting edge web, said inner and outer shells being spaced from one another to define a space containing air, and said shells being welded or glued to one another in the region of said webs to seal the air space; and
    a lid that can be placed in an airtight manner onto said supporting edge, said lid having a two-part structure which includes an inner lid shell and an outer lid shell, each said lid shell having a circumferential, laterally projecting edge web, said inner and outer lid shells being spaced from one another to define a space containing air, and said lid shells being welded or glued to one another in the region of said lid shell edge webs to seal the air space between said lid shells,
    wherein said upper supporting edge is provided with a groove which deepens toward the interior of said dish, said lid is provided with a ventilation bore which is located to be outside of said upper supporting edge when said lid is placed on said dish, and said edge web of said inner shell has an upper surface provided with a recess which communicates with said bore when said lid is placed on said dish.

10. A container as defined in claim 9 wherein said recess extends around the entire circumference of said edge web of said inner shell.

11. A container for use in microwave ovens, comprising:
    a dish having an upper supporting edge and a two-part structure which includes a plastic, microwave-transparent inner shell and a plastic, microwave-transparent outer shell, each said shell having a peripheral, laterally projecting edge web, said inner and outer shells being spaced from one another to define a space containing air, and said shells being welded or glued to one another in the region of said webs to seal the air space;
    a lid that can be placed in an airtight manner onto said upper supporting edge, said lid having a two-part structure which includes an inner lid shell and an outer lid shell, each said lid shell having a circumferential, laterally projecting edge web, said inner and outer lid shells being spaced from one another to define a space containing air, and said lid shells being welded or glued to one another in the region of said lid shell edge webs to seal the air space between said lid shells, wherein said supporting edge has a radially exterior surface provided with two mutually offset steps, and wherein said lid has a closing edge provided with corresponding projections, with the engagement of both projections with said steps producing an airtight seal for said dish, while engagement of only one projection in one step produces a closure of the dish which permits air to escape from the region between said dish and said lid.

12. A bowl-shaped dish for use in microwave ovens, said dish having a two-part structure comprising a plastic, microwave-transparent inner shell and a plastic, microwave-transparent outer shell, each said shell having a peripheral, laterally projecting edge web, said inner and outer shells being spaced from one another to define a space containing air, and said shells being welded or glued to one another in the region of said webs to seal the air space, wherein said edge webs have first portions and second portions which surround said first portions, wherein said second portions of said edge webs are sealed together, wherein said first portion of said edge web of said outer shell has at least one upwardly extending supporting boss, and wherein said first portions of said edge webs are spaced-apart except at said at least one supporting boss, said at least one supporting boss being attached to said first portion of said edge web of said inner shell.

13. A dish as defined in claim 12, wherein each of said shells has a bottom portion, and wherein said bottom portion of said outer shell has a plurality of upwardly extending supporting bosses which are attached to said bottom portion of said inner shell.

14. A dish as defined in claim 12, wherein said inner shell has a rim with an upper supporting edge adjacent said edge web of said inner shell, said air space extending into said rim, in combination with a plastic lid which fits onto said rim.

15. The combination as defined in claim 14, wherein said rim has an outer surface which faces said edge web of said inner shell, and wherein said lid has a closing surface which engages said outer surface of said rim.

16. A container for use in microwave ovens, comprising:
a dish having a two-part structure which includes a plastic, microwave-transparent inner shell and a plastic, microwave-transparent outer shell, each said shell having a peripheral, laterally projecting edge web, said inner and outer shells being spaced from one another to define a space containing air, and said shells being welded or glued to one another in the region of said webs to seal the air space, said inner shell having a rim with an upper supporting edge adjacent said edge web of said inner shell, said air space extending into said rim, said rim having an outer surface which faces said edge web of said inner shell; and
a plastic lid which fits onto said rim, said lid having a closing surface which engages said outer surface of said rim,
wherein said outer surface of said rim has two steps, and wherein said closing surface of said lid has two corresponding projections, with the engagement of both projections with said steps producing an airtight seal for said dish, while engagement of only one projection in one step produces a closure of the dish which permits air to escape from the region between said dish and said lid.

17. A container for use in microwave ovens, comprising:
a thin-walled upper shell made of a single piece of microwave-transparent plastic, the upper shell including a bottom, a side wall extending upward from the bottom, a radially projecting edge web having an outer portion and an inner portion, and means for connecting the edge web to the side wall; and
a thin-walled lower shell made of a single piece of microwave-transparent plastic, the lower shell including a bottom, a side wall extending upward from the bottom of the lower shell, and a radially projecting edge web connected to the side wall of the lower shell, the edge web of the lower shell having an inner portion and an outer portion,
wherein the outer portions of the edge webs are sealingly connected, and wherein an air space extends between the bottoms, side walls, and inner portions of the edge webs of the shells.

18. The container of claim 17, wherein the bottom of the lower shell has a plurality of upwardly extending bosses which are connected to the bottom of the upper shell, the bottoms being spaced-apart except at the bosses, and wherein the inner portion of the edge web of the lower shell has at least one upwardly extending further boss which is connected to the inner portion of the edge web of the upper shell, the inner portions of the edge webs having spaced-apart except at the at least one further boss.

19. The container of claim 17, wherein the means connecting the edge web of the upper shell to the side wall of the upper shell comprises a rim having a supporting edge, the supporting edge being disposed above both edge webs and the air space extending into the rim.

20. The container of claim 19, wherein the rim has an outer surface which faces the edge web of the upper shell, and further comprising a lid to fit on the rim, the lid having a closing surface which engages the outer surface of the rim.

21. The container of claim 20, wherein the outer surface of the rim has two steps, and wherein the closing surface of the lid has two corresponding projections, with the engagement of both projections with the steps producing an airtight seal, while engagement of only one projection in one step produces a closure which permits passage of air.

22. The container of claim 17, wherein the upper shell has walls with approximately uniform wall thickness, and wherein the lower shell has walls with approximately uniform wall thickness.

* * * * *